United States Patent [19]

Djali

[11] Patent Number: 4,676,754
[45] Date of Patent: Jun. 30, 1987

[54] VISUAL AID FOR TEACHING LINEAR RELATIONSHIPS

[76] Inventor: Reza Djali, 177 Mount Pleasant, Kingswinford West Midlands, DY6 9SS, England

[21] Appl. No.: 827,937

[22] Filed: Feb. 10, 1986

Related U.S. Application Data

[63] Continuation-in-part of Ser. No. 715,905, Mar. 25, 1985, abandoned.

[30] Foreign Application Priority Data

Aug. 25, 1984 [GB] United Kingdom ................. 8421651

[51] Int. Cl.[4] ........................................... G09B 23/04
[52] U.S. Cl. ............................................... 434/215
[58] Field of Search ...................... 434/211, 214, 215

[56] References Cited

U.S. PATENT DOCUMENTS 771,663 10/1904 Percy ............................... 434/211 X
3,340,624 9/1967 Savin et al. ......................... 434/214
3,414,190 12/1968 Lemiesz .......................... 434/215 X Primary Examiner—William H. Grieb

[57] ABSTRACT

FIG. 5 shows a background sheet A featuring the axes X and Y. A transparent strip E is pivotally assembled to A at the pivot point O. A transparent flat tube F is slidable on E. A straight line D is drawn on E and F through O. An operating button G is attached to F. A transparent cover sheet H is placed over the assembly. A small gap K is left between A and H by means of the distance pieces L. A slot J in the cover sheet H provides access to G. The axes may be calibrated to represent any entities involved in linear relationships, such as percentages, elements of multiplication, division etc. The gradient of the line D may be varied manually, thereby illustrating varying rate of proportionality.

12 Claims, 8 Drawing Figures

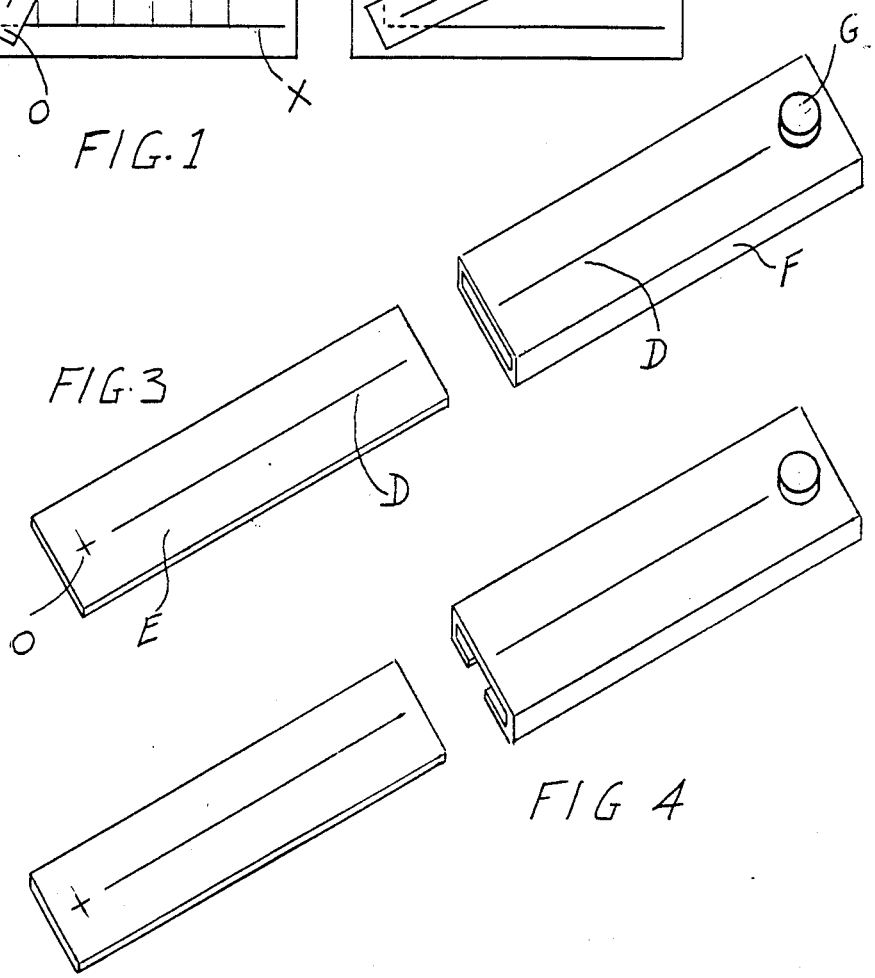

VISUAL AID FOR TEACHING LINEAR RELATIONSHIPS

A substantial part of this specification was disclosed in my prior application, Ser. No. 06/715,905 filed Mar. 25th, 1985 and subsequently abandoned. I claim priority under 35 USC 120 for the subject matter disclosed in the prior application. The present application is a continuation-in-part of U.S. Ser. No. 06/715,905.

In mathematics any two variable such as x and y which are related by the general formula $y=mx+c$ are said to be linearly related since the graph of y against x forms a straight line. When the value of c is kept at zero or any other constant, then the varying values of m produce a family of straight lines all passing through the same point.

This invention provides a visual aid for demonstrating this fact and its applications by a movable straight line fixed at one point. Moreover, the invention provides means of varying the apparent length of the straight line. This confines the straight line to within the rectangular boundary of the graph sheet while maintaining its ability to reach the corner furthest away from the fixed point when necessary.

A number of embodiments of the invention will now be described by way of example with the aid of the accompanying drawings in which:

FIGS. 1 and 2 show the assembly of the graph sheet and a transparent strip at two different settings.

FIGS. 3 and 4 show two alternative ways of varying the apparent length of the straight line.

In FIG. 1, the graph sheet A, features the horizontal axis X and the vertical axis Y meeting at the point O. A transparent strip B, is pivotally assembled to the graph sheet at O. The transparent strip features the straight line D, colinear with the pivot point. The pivotal freedom of the line D allows it to represent a family of straight lines passing through O. In this figure the transparent strip is shown at a position corresponding to $y=2x$ In FIG. 2 the transparent strip is set at a position corresponding to $y=\frac{1}{2}x$. At this position a large part of the transparent strip B is outside the rectangular boundary of the graph sheet.

FIG. 3 shows in perspective an exploded view, comprising of a shorter transparent strip E, being slideable in a thin transparent flattened tube F, each part featuring a segment of the straight line D, which in assembly will appear to be continuous and of variable length.

The pivot point O, is on the one part, in this case, on E and an operating knob G, is attached to the other part, in this case to F.

FIG. 4 shows an alternative way of achieving the slideable construction by using a suitably folded sheet or strip to replace the flattened tube.

Figure 5:
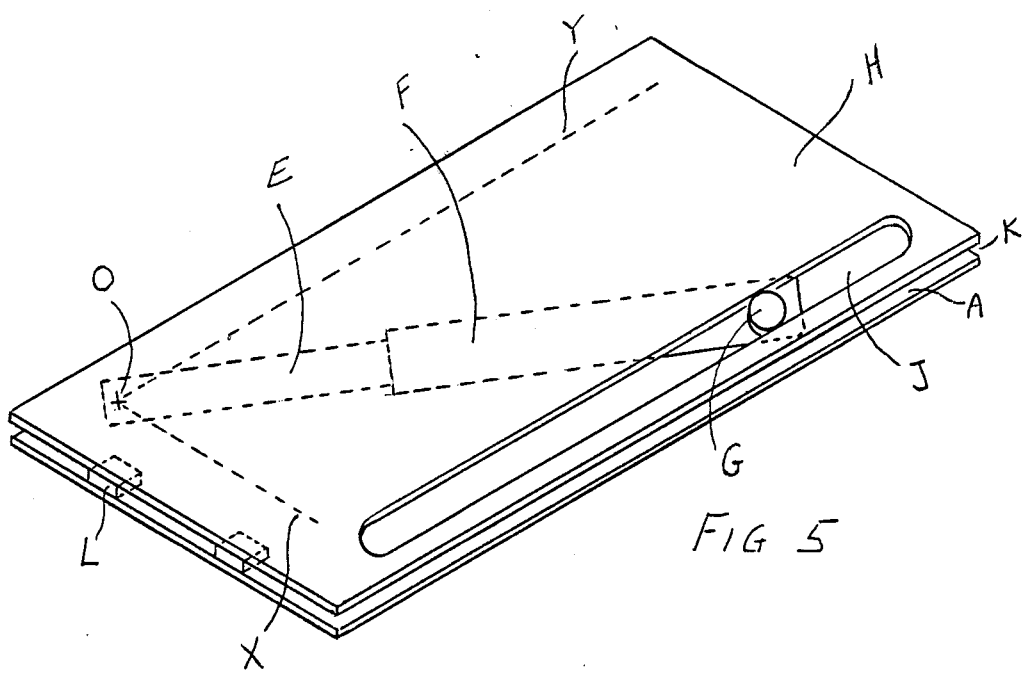
FIG. 5 shows the assembly of the graph sheet, the straight line and a top cover sheet.

In FIG. 5, the graph sheet A, features the X and Y axes meeting at O. The transparent strip E is pivotally assembled to the graph sheet at O. The flattened tube F is slideably assembled to the strip E. A transparent sheet H is fitted over the assembly. The cover sheet H has a slot J to allow access to the operating knob G. A small gap K is left between the two sheets by using distance pieces L or by other means.

Figure 6:
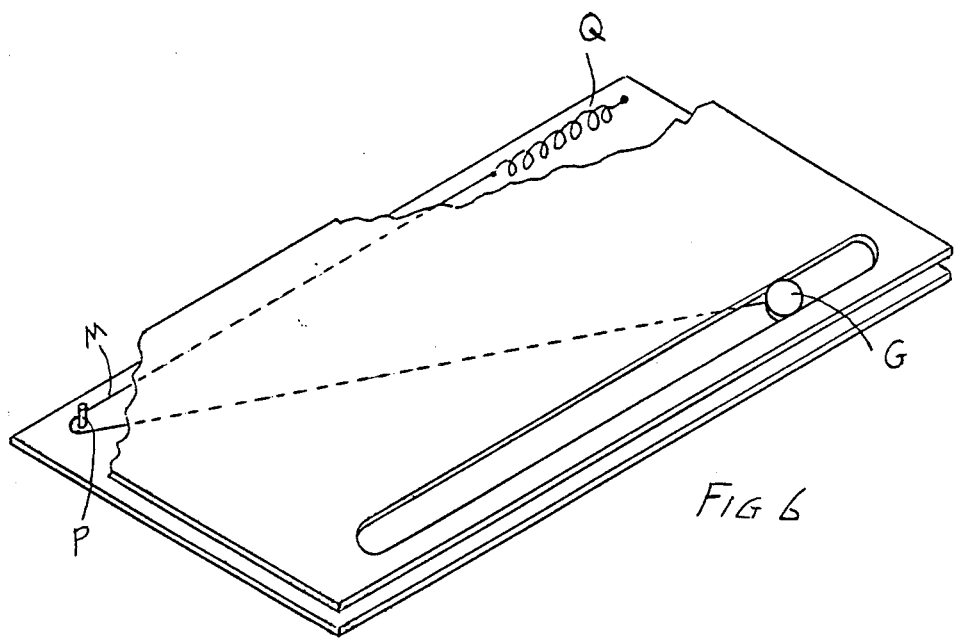
FIGS. 6 and 7 show two further embodiments of the invention involving the use of monofilament to form the straight line.

FIG. 6 shows an alternative embodiment of the invention in which a piece of string, wire, monofilament or similar material M, is used to represent the straight line. One end of the monofilament is attached to the operating knob G. The monofilament goes round a pin P at O and is held in tension by the spring Q.

Figure 7:
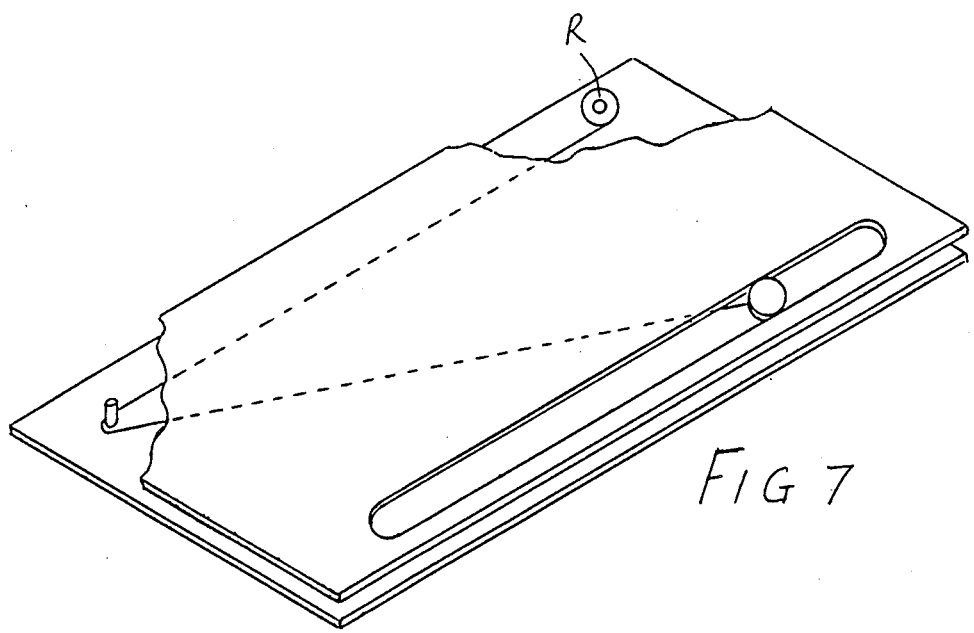

In FIG. 7 the function of the spring Q is performed by a spring loaded self winding spool R.

Figure 8:
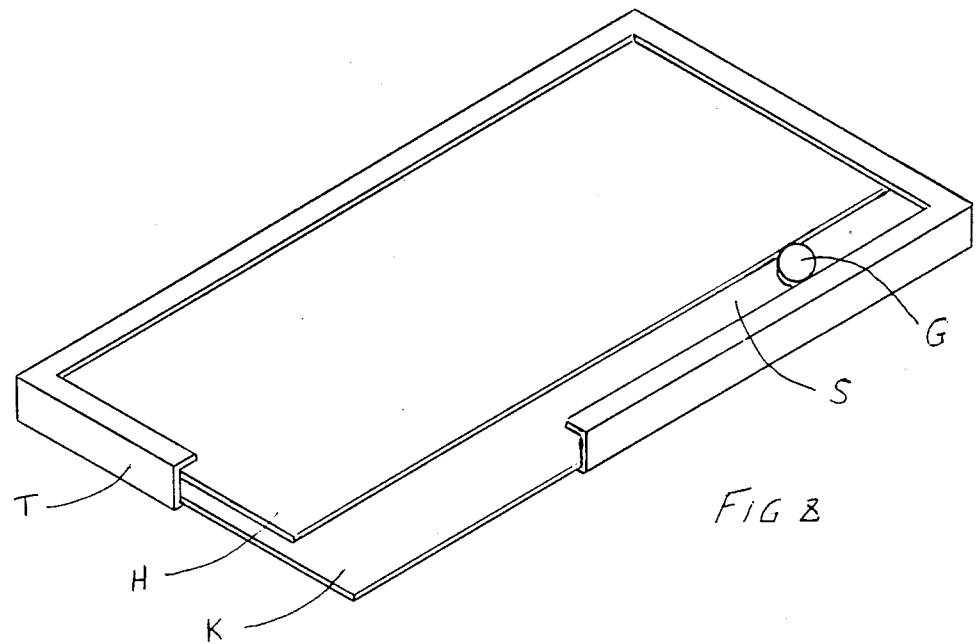
FIG. 8 shows a simpler method of achieving the function of the slot seen in FIGS. 5, 6 and 7.

The function of the slot J in FIG. 5 may be achieved by a simple alternative shown in FIG. 8 wherein the top cover sheet H is narrower than the backgroud member K. This provides access to the button G. The movement of the button G is confined by the gap S defined between the top cover sheet H and the frame T. In FIG. 8 the frame is shown partly removed for clarity.

In yet another embodiment the material of the string M may be wholly or in part elastic to achieve the retractable effect.

The graph sheet mentioned in the above descriptions may be opaque for direct demonstration or transparent for projection through an overhead projector.

The X and Y axes in the description may represent any entities involved in linear relationships such as percentages, ratio, proportion, elements of multiplication, division, elements of fractions, cross multiplication, and be calibrated accordingly.

What is claimed is:

1. A device for demonstrating linear relationships comprising a background member featuring calibrated axes; means to represent a pivotally movable straight line going through a fixed point on said background member, characterized by provision of means to make said straight line capable of extension and contraction.

2. A device according to claim 1 wherein said background member features a grid based on the calibrations of said axes.

3. A device according to claim 1 wherein said straight line is represented by a string or thread or monofilament.

4. A device according to claim 3 wherein said thread, string or monofilament is wholly or in part elastic.

5. A device according to claim 3 wherein said thread, string or monofilament is attached to a spring or to a spring loaded self winding spool or to a piece of elastic material.

6. A device according to claim 1 wherein said straight line is featured on an assembly of slidable parts capale of telescopic extension and contraction.

7. A device according to claim 3 wherein said string, thread or monofilament is attached to an operating knob or button.

8. A device according to claim 6 wherein said assembly of slidable parts is attached to an operating knob or button.

9. A device according to claim 1 which a transparent cover sheet is added.

10. A device according to claim 9 wherein said cover sheet has a slot to give access to said movable line.

11. A device according to claim 9 to which a frame is added.

12. A device according to claim 11 wherein said cover sheet is narrower than said background member thereby defining a gap between said frame and said cover sheet to provide access to said movable line.

* * * * *